United States Patent Office 2,994,694
Patented Aug. 1, 1961

2,994,694
18-OXYGENATED STEROIDS AND PROCESS FOR THEIR SYNTHESIS
Albert Wettstein, Georg Anner, and Karl Heusler, Basel, Hellmut Ueberwasser, Riehen, and Peter Wieland, Julius Schmidlin, and Jean-René Billeter, Basel, Switzerland, assignors to Ciba Pharmaceutical Products, Inc., Summit, N.J.
No Drawing. Filed Nov. 28, 1958, Ser. No. 776,690
Claims priority, application Switzerland July 30, 1954
34 Claims. (Cl. 260—239.57)

This is a continuation in part of our copending application Serial No. 521,398, filed July 11, 1955.

Among the 18-oxygenated steroids, the hormone aldosterone isolated from adrenal glands, is of extreme importance, more especially because of its specific effect on the mineral metabolism. Since, however, on one hand, the quantities in which it occurs in animal organs are too small for producing the hormone economically, and since, on the other hand, it has hitherto not been possible to prepare aldosterone by partial synethesis from other naturally occurring steroids, its manufacture by total synthesis is of considerable industrial importance.

The present invention provides a new process for synthesizing aldosterone and its derivatives in a simple manner from a $\Delta^{4:18}$-3:16-dioxo-11$\beta$:18a-oxido-18a-methyl-18-homoandrostadiene of the formula

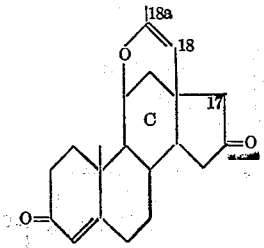

or from a corresponding 3-ketal which may contain a further double bond in the 14:15-position.

The new process can be subdivided into four main parts:

(A) Degradation of the cyclic enol ether grouping at ring C to the 18:11-cyclo-semiacetal structure typical of aldosterone;
(B) Condensation with an oxalic acid ester in the 17-position and formation of derivatives to protect the 20-oxo group;
(C) Hydrogenation of the 14:15-double bond and elimination of the oxygen grouping in the 16-position; and
(D) Conversion of the side chain into the ketol side chain of aldosterone.

One variant of the synthesis is represented by the following formula scheme:

Part A:

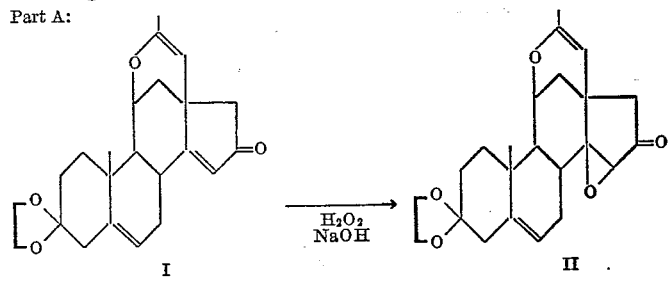

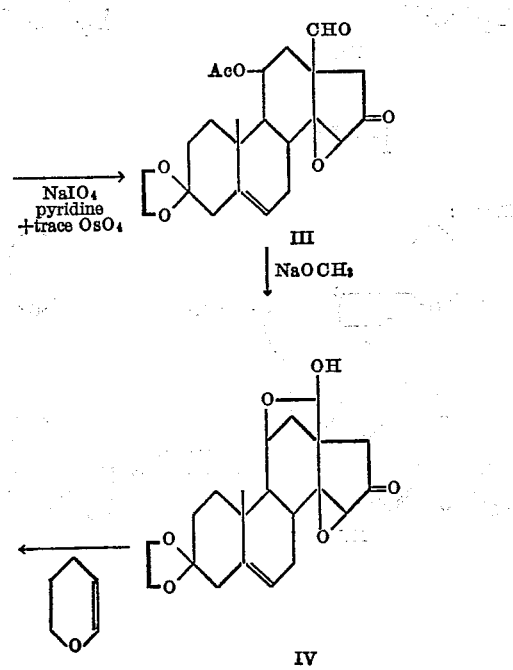

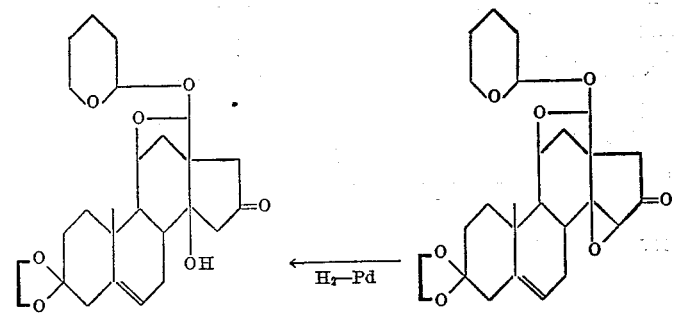

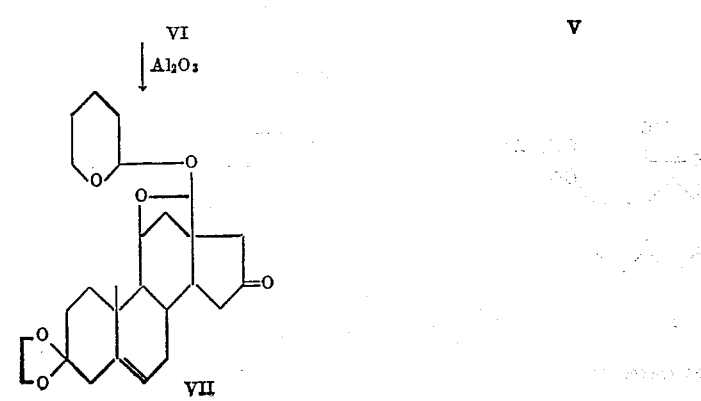

Part B:
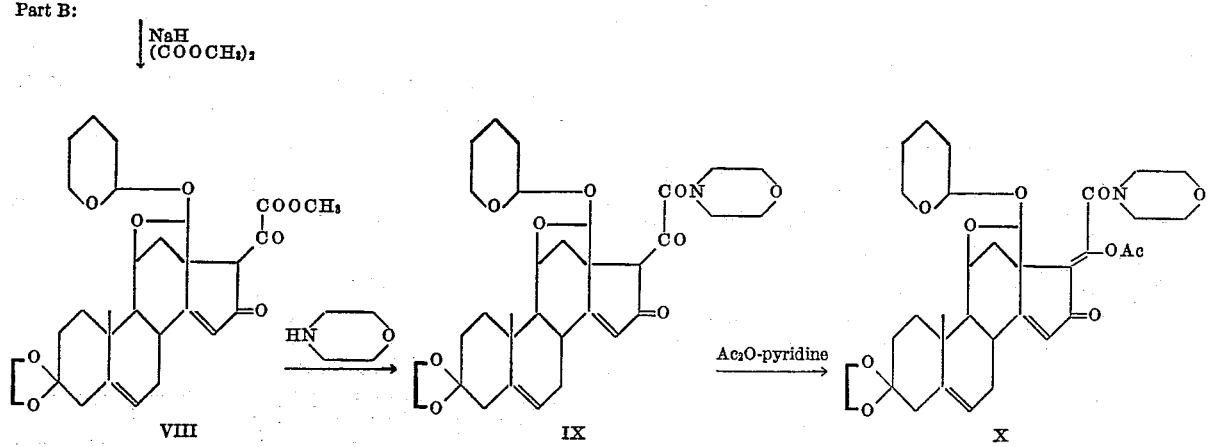
VIII → IX → X
Part C:
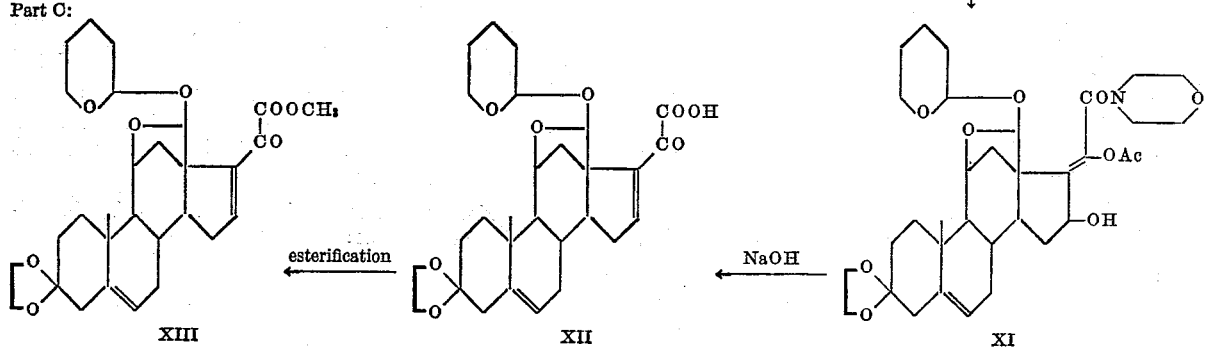
XIII ← XII ← XI
Part D:
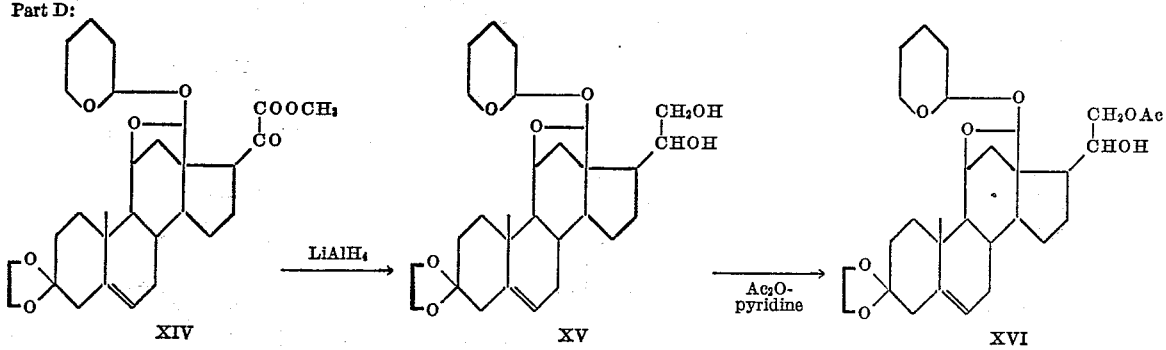
XIV → XV → XVI
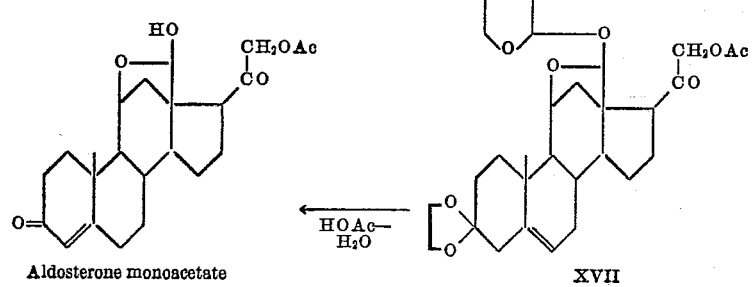
Aldosterone monoacetate ← XVII The present patent application is concerned with Part A of the process described above, that is to say with the degradation of the cyclic enol ether to 18:11-cyclo-semiacetal.

According to the present process the 18:18a-double bond in a Δ⁴·¹⁸-3:16-dioxo-11β:18a-oxido-18a-methyl-18-homo-androstadiene of the formula

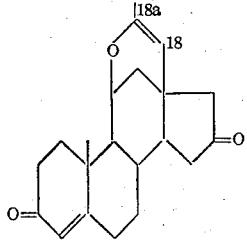

which may contain a further double bond in the 14:15-position, or in a corresponding 3-ketal, is subjected to oxidative cleavage and, in the resulting 11β-acetoxy-18-oxo-compound, the 11β-acetoxy group is hydrolyzed in an alkaline medium; if a 14:15-double bond is present, it or the 16-oxo group is temporarily protected; if desired, the semi-acetal group is functionally converted, and, if desired, the 14:15-double bond is hydrogenated at any stage of the process.

The cleavage of the 18:18a-enol double bond is performed, for example in the manner generally known for the oxidative cleavage of double bonds. The ozonides, obtained by the action of ozone, are split under reducing conditions, for example with zinc and acetic acid, zinc and ethanol, noble metal catalysts (e.g. palladium, platinum) on a support (e.g. charcoal, barium sulfate or other standard support) with hydrogen or any other standard technique for such reductive process. The cleavage of the enol double bond can be performed even by oxidation with compounds of hexavalent chromium, for example with chromic acid in pyridine. It is also possible to hydroxylate the enol double bond in a manner known per se, for example by reaction with a molecular proportion of osmium tetroxide, potassium permanganate, etc., the resulting glycol being split up with per-iodic acid, lead tetra-acetate, sodium bismuthate, etc. Particularly advantageous results have been achieved with a new, extremely mild hydroxylation method, according to which the oxidation is performed with an alkali metal perhalate, such as the perchlorate and particularly the per-iodate, for example with sodium per-iodate in the presence of a catalytic amount of osmium tetroxide with the addition of an alkali metal salt of a carboxylic acid (particularly a lower fatty acid), such as potassium acetate, in an aqueous medium. This procedure gives an almost quantitative yield of the glycol which can be split with the aid of the per-iodic acid or other equivalent reagent. When pyridine instead of potassium acetate is used as buffer, the 11β-acetoxy-18-oxo compound is formed directly, instead of the glycol.

By virtue of the presence of the 18-oxo group the 11β-acetoxy group can be hydrolyzed even under relatively mild conditions. For example, there may be used an alkali metal carbonate, such as potassium carbonate in an inert solvent, such as aqueous methanol or dioxane. Transesterification may also be effected to yield the same result by means of a solution of an alkali metal in an absolute lower alkanol, e.g. sodium methoxide, potassium ethoxide. As a rule, a temperature about 20° C. will suffice to complete the reaction within a few hours. The 11β-hydroxy-18-oxo compounds produced by the hydrolysis are—at least in solution—almost entirely present in the form of cyclo-semiacetals.

If desired, the free hydroxyl group of the cyclo-semiacetal can be esterified, etherified or oxidized to an oxo group. The esterification is conducted in a manner known per se with a reactive derivative of a carboxylic acid, such as an acid anhydride or halide in the presence of an acid-acceptor such as pyridine. Suitable esterifying agents are reactive derivatives of fatty acids; particularly lower fatty acids as well as aromatic acids, particularly monocyclic carbocyclic aromatic acids, for example, the anhydrides or acid halides of acetic acid, propionic acid or butyric acid, or benzoyl chloride or trimethylacetic acid chloride. Alternatively, the 18-esters can be prepared by transesterification, for example by heating an 18-ester of a low-boiling acid with a salt of a high-boiling acid, such as a tertiary amine salt, for example triethylamine salt.

The etherification is advantageously performed in the presence of a condensing agent of weak acidic reaction, i.e. a Lewis acid, such as zinc chloride, ferric chloride, titanic chloride, aluminum bromide, pyridine hydrochloride or the like. Suitable etherifying agents are orthoformic acid esters, such as the methyl, ethyl (i.e. lower alkyl) or benzyl ester of orthoformic acid, and more particularly dihydropyran. Both the esters and the ethers are easy to split off again, for example by a short heat treatment in an aqueous carboxylic acid, such as aqueous acetic acid or other lower fatty acids etc. The esters can also be split by mild alkaline hydrolysis with alkali metal bicarbonate, carbonates, alkoxides, alkali and alkaline earth metal hydroxides. Examples of these standard reagents are sodium bicarbonate, potassium carbonate, sodium ethoxide, sodium propoxide, lithium isopropoxide, lithium hydroxide, sodium hydroxide, barium hydroxide, etc.

The cyclo-semiacetal group is easy to oxidize to the lactone group. This can be performed with compounds of hexavalent chromium, such as chromic acid in pyridine, chromic acid in glacial acetic acid, sodium bichromate, or with other oxidants such as manganese dioxide.

When the cleavage of the cyclic enol ether is performed on a Δ¹⁴-16-keto compound, the 11β-acetoxy group can be hydrolyzed only after the sensitive vinylogous β-ketoaldehyde grouping of the Δ¹⁴-11β-acetoxy-16:18-dioxo compound formed has been protected. This can be achieved, for example, by ketalizing one of the two oxo groups with a 1:3- or a 1:2-glycol particularly a lower alkylene glycol, such as ethylene glycol or propylene glycol, or by conversion into a (1) thioketal or (2) semi-thioketal, for example with (1) a lower alkylene mercaptan (e.g. ethylene mercaptan) or (2) a mercapto lower alkanol (e.g. mercaptoethanol) in the presence of a ketalization catalyst, for example with pyridine hydrochloride. With ethylene glycol, for example, an 18-ketal is formed, and with ethylene mercaptan a 16-thioketal. The thioketals are particularly suitable for temporary protection because they can be split again to yield the ketone, for example with the aid of a mercury or cadmium salt, in a selective manner, that is to say without affecting any other ketal group, for example in the 3-position.

Alternatively, the Δ¹⁴-16-oxo grouping can be so converted before the oxidative cleavage of the enol double bond that the sensitive Δ¹⁴-18-oxo-16-ketone does not occur at all as an intermediate in the subsequent reactions. Thus, for example, the 16-keto group in the starting material can be reduced to the carbinol with a complex metal hydride, such as lithium-aluminum hydride, lithium-boron hydride or sodium-boron hydride, etc. The oxidative cleavage of the enol ether double bond in the manner described above yields a Δ¹⁴-11β-acetoxy-18-oxo-16-hydroxy-compound which can then be hydrolyzed to the cyclo-semiacetal. The 16-hydroxy group is then oxidized to the 16-oxo group, for example with the aid of manganese dioxide.

An especially advantageous order of sucession of the reactions leading to the cyclo-semiacetal derivatives (esters and ethers) of Δ¹⁴-11β-hydroxy-16:18-dioxo-androstenes with the use of an epoxide to protect the 14:15-double bond has been illustrated in the formula scheme in the introduction hereto. According to this succession of reactions the 3-ketal of $\Delta^{4:14:18}$-3:16-dioxo-11β:18a-oxido-18a-methyl-18-homo-androstatriene, used as starting material, is converted with hydrogen peroxide in an alkaline solution into the corresponding 14:15-epoxide. It is surprising that in this reaction the enol double bond is not affected. The 18:18a-enol double bond in the resulting epoxide is then subjected to oxidative cleavage as described above, and the 11β-acetoxy group is hydrolyzed. Before or after the esterification or etherification of the cyclo-semiacetal group the 14:15-epoxide is then opened up to the 14-hydroxy compound by catalytic hydrogenation, preferably in the presence of a noble metal (e.g. palladium) catalyst on a support such as charcoal, calcium carbonate, barium sulfate or zinc carbonate. The 14:15-double bond is then reintroduced by elimination of water from the 14-hydroxy-16-ketone, advantageously under alkaline conditions. Suitable water-eliminating agents are also salts such as piperidine benzoate or acetate or triethylamine benzoate. The elimination of water is particularly easy by heating with alumina in an inert solvent such as benzene, toluene or the like. The retention or temporary protection and subsequent reintroduction of the 14:15-double bond is of considerable importance because it has been observed that the steric course of the catalytic hydrogenation of this double bond depends surprisingly on the substitution at the carbon atom in the 18-position. With the cyclic enol ethers used as starting materials for the present process, as well as with the 11β-acetoxy-18-oxo compounds obtained by oxidative cleavage of the enol double bond, a preponderance of the "unnatural" 14β-compounds is obtained by the catalytic hydrogenation. On the other hand, the $\Delta^{14}$-16-oxo compounds containing 18:11-cyclo-semi-acetal groups or 18:11-lactone groups yield almost exclusively the natural 14α-compounds having trans-linked rings C and D. Thus, to ensure a high yield of 14α-compounds, it is of advantage to introduce the 18:11-cyclo-semiacetal grouping before the 14:15-double bond is hydrogenated.

If desired, $\Delta^4$-3:16-dioxo compounds can be converted into 3-monoketals by ketalization with methylethyl dioxolane in the presence of a catalytic quantity of paratoluenesulfonic acid, as has been previously disclosed in Indian Patent No. 52,534 corresponding to U.S. patent application Serial No. 521,398, filed July 11, 1955.

The 14:15-saturated 11:18-dioxygenated $\Delta^4$-3:16-dioxoandrostenes, more especially their 3-ketals, can be converted into the corresponding 18:11-lactones in the manner described hereinbefore as well as in the examples. A 17-carbalkoxy group can be introduced in said lactones according to the process of Indian application No. 61,333 corresponding to U.S. patent application Serial No. 747,346, filed July 9, 1958, by condensation with a carbonic acid ester. Enolacetylation and hydrogenolytic elimination of the enolacetate group yields the 16-unsubstituted acetic ester which is converted into aldosterone as disclosed in Indian Patent No. 51,359 corresponding to U.S. patent application Serial No. 480,061, filed January 5, 1955, and now U.S. Patent No. 2,904,545.

The present invention also provides 11:18-dioxygenated 16-oxo-androstanes, more especially 11β-acyloxy-16:18-dioxo-androstanes, $\Delta^{4:14}$-3:16:18-trioxo - 11β - acetoxy-androstadiene, $\Delta^4$-3:16:18-trioxo - 11β - acetoxy-14:15-oxido-11β-androstene the free, esterified and etherified 18:11-cyclo-semiacetals of 11β-hydroxy - 16:18 - dioxo-androstanes, e.g. $\Delta^4$-3:16:18-trioxo-11β-hydroxy-androstene, of $\Delta^{4:14}$-3:16:18-trioxo-11β-hydroxy-androstadiene, of $\Delta^4$-3:16:18-trioxo-11β-hydroxy - 14:15 - oxido androstene, of $\Delta^4$-3:16:18-trioxo-11β:14-dihydroxy-androstene; the 18:11-lactone of $\Delta^4$-3:16-dioxo-11β-hydroxyandrostene-18-acid; the 18:11-lactone of $\Delta^{4:14}$-3:16-dioxo-11β-hydroxy-androstadiene-18-acid; as well as the 3-ethylene ketals of the afore-mentioned compounds.

These compounds are valuable intermediates for the manufacture of aldosterone and of its derivatives.

The products of the present process are racemates or optically active compounds. Racemates are suitable for the usual cleavage yielding optically active compounds. The starting materials to be used in the present process have been described in Indian Patent No. 52,534 corresponding to U.S. patent application Serial No. 521,398, filed July 11, 1955.

The present invention also covers variants of the process in which only some of the steps are performed, if desired in a different order of succession, or in which the starting material used is an intermediate obtained at any stage of the process and the remaining step or steps are carried out.

The following examples illustrate the invention.

*Example 1*

A solution of 290 mg. of osmium tetroxide in 10 cc. of absolute ether is stirred into a solution of 340 mg. of d:1 - $\Delta^{4:18}$ - 3:16 - dioxo - 11β:18a - oxido - 18a - methyl-18-homo-14-iso-androstadiene in 20 cc. of absolute tetrahydrofuran and 0.22 cc. of pyridine. After 1 hour the stirrer is switched off, and the reaction solution is kept overnight at room temperature; the adduct crystallizes out but can be dissolved again by adding 100 cc. of methanol. A solution of 4 grams of ammonium sulfite in 100 cc. of water is then stirred in and after 1½ hours Celite is added to make the precipitate formed easier to filter. After filtration through a layer of Celite and washing its filter residue with 500 cc. of methanol, the filtrate is concentrated in vacuo at 50–60° C. to about 50 cc. and extracted 4 times with 50 cc. of a mixture of 7 parts of chloroform and 3 parts of alcohol. The chloroform/alcohol extracts are separately shaken with 60 cc. of semi-saturated common salt solution. The residue (320 mg.) of the dried and evaporated organic solution is dissolved in 7.5 cc. of methanol and 1.25 cc. of pyridine, and 1.5 cc. of a 0.912 N-solution of periodic acid are added. The mixture is kept for 1 hour at room temperature, 50 cc. of semi-saturated common salt solution are added, and the whole is extracted four times with 50 cc. of chloroform. The chloroformic solutions are washed with 50 cc. of semi-saturated common salt solution, dried, and evaporated in vacuo, and the residue is chromatographed over 9 grams of alumina (activity II). The benzene, ether and ether/ethyl acetate (9:1) eluates contain d:l-$\Delta^4$-3:16:18-trioxo-11β-acetoxy-14-iso-androstene (146.5 mg.) which, after dissolution in and crystallization from acetone/ether, melts at 161–165.5° C. The infrared spectrum (solvent: methylene chloride) displays the following bands in the carbonyl area: 3.67μ (aldehyde); 5.72μ, broad (aldehyde+ester+5-ring-CO) and 5.96μ+6.15μ (α:β-unsaturated carbonyl).

A solution of 25 mg. of the above 11β-acetate and 100 mg. of potassium carbonate in 6 cc. of alcohol and 3 cc. of water is refluxed for 1 hour in a current of nitrogen, the reaction mixture is poured into semi-saturated common salt solution and extracted once with benzene and three times with chloroform. The organic solutions are washed with saturated common salt solution, dried, and evaporated; dissolution of the residue in acetone+ether and recrystallization yields d:l-$\Delta^4$-3:16:18-trioxo-11β-hydroxy-14-iso-androstene cyclo-semiacetal melting at 221–226° C. In the infrared spectrum (solvent: methylene chloride) the aldehyde band at 3.67μ can no longer be seen. Characteristic bands appear at 2.78μ (hydroxyl), 5.72μ (5-ring-ketone band) and at 5.97μ+6.17μ (the $\Delta^4$-3-ketone bands).

The hydrolysis can alternatively be performed by keeping a solution of 41.8 mg. of the 11β-acetate and 54 mg. of potassium carbonate in 6.5 cc. of methanol and 1.75 cc. of water for 22 hours in an evacuated ampoule at room temperature.

*Example 2*

7.0 grams of d:l-$\Delta^{5:14:18}$-3-ethylenedioxy-11β:18a-oxido-16-oxo-18a-methyl-18-homo-androstatriene, dissolved in 10 cc. of dry pyridine and 80 cc. of chloroform, are treated for 28.5 minutes at −15° to −18° C. with turbination with a current of oxygen containing ozone, capable of supplying 24.5 mg. of ozone per minute to the reaction mixture. When the reacted gases are passed through a first specimen of a mixture of 0.5 cc. of 0.02 N-thiosulfate solution, 1 cc. of potassium iodide solution of 10% strength, 0.5 cc. of starch solution and 0.5 cc. of 2 N-acetic acid, it turns brown-violet after 28 minutes. The change in color of the subsequent second test occurs after 30 seconds. The oxygen is then displaced by nitrogen, and the ozonides formed—after addition of a mixture, pre-cooled to −10° C., of 10 cc. of water, 20 cc. of pyridine and 10 cc. of glacial acetic acid—are reduced with 15 grams of zinc powder in the form of a paste moistened with water and activated with dilute acetic acid, during which the temperature rises temporarily to −50 C. The reaction mixture is once again cooled to −7° C., and the unreacted zinc is filtered off and rinsed with benzene. The filtrate is washed repeatedly with water and then with sodium bicarbonate solution of 10% strength, four times with 100 cc. of ice-cold 1.5 N-phosphoric acid on each occasion, once again with water, and finally with bicarbonate solution. The whole is dried, and the solvents are removed in vacuo. Addition of 2 cc. of methylene chloride and 10 cc. of ether to the crude product causes the crystallization of 3.3 of d:1-$\Delta^{5:14}$-3-ethylenedioxy-11$\beta$-acetoxy-16:18-dioxo-androstadiene which, after dissolution in and crystallization from benzene, melts at 188–189° C. Infrared spectrum in methylene chloride; no hydroxyl band; at 3.7$\mu$ (aldehyde); broad band at 5.75$\mu$–5.82$\mu$ with inflexion at 5.9$\mu$ (ester, aldehyde, 16-carbonyl); 6.22$\mu$ ($\Delta^{14}$); 8.16$\mu$ (acetate); 9.1$\mu$ (ketal). Ultraviolet spectrum $\epsilon_{234\,m\mu}$=12,900.

Example 3

500 mg. of d:1$\Delta^{5:18}$-3-ethylenedioxy-11$\beta$:18a-oxido-16-oxo-18a-methyl-18-homo-14-iso-androstadiene are stirred with ice-cooling into 500 mg. of chromium trioxide in 6 cc. of absolute pyridine. The mixture is stirred for 20 hours at room temperature, semi-saturated common salt solution and benzene are added, and the whole is filtered through Celite. The filter residue is washed with benzene and then with water, and the aqueous phase of the filtrate is then extracted twice with benzene. The benzolic solutions are twice washed with semi-saturated common salt solution, dried and evaporated in vacuo; the residue is chromatographed over 15 grams of alumina (activity II). The first benzene fractions contain starting material. The subsequent benzene eluates contain d:1$\Delta^5$ - 3 - ethylenedioxy - 16:18 - dioxo - 11$\beta$ - acetoxy-14-iso-androstene which, after dissolution in and crystallization from ether, melts at 171–172° C. The infrared spectrum (solvent: methylene chloride) displays the following characteristic bands: 3.68$\mu$ (aldehyde); 5.75$\mu$ intensive (aldehyde+5-ring-CO+ester); 8.14$\mu$ (acetate) and 9.15$\mu$ (ketal).

Example 4

1.0 gram of d:1$\Delta^{5:18}$-3-ethylenedioxy-11$\beta$:18a-oxido-16-oxo-18a-methyl-18-homo-14-iso-androstadiene, dissolved in 5 cc. of pyridine and 50 cc. of chloroform, is treated as described in Example 2 for 33 minutes with an ozone-containing current of oxygen capable of supplying 5.28 mg. of ozone per minute, and worked up as described in Example 2. The resulting d:1-$\Delta^5$-3-ethylenedioxy-11$\beta$-acetoxy-16:18-dioxo-14-iso-androstene is completely identical with the compound described in Example 3.

The same compound can alternatively also be prepared from the d:1-$\Delta^{5:14}$-3-ethylenedioxy-11$\beta$-acetoxy-16:18-dioxo-androstadiene described in Example 2 in the following manner:

400 mg. of this compound are hydrogenated in 60 cc. of absolute ethanol under atmospheric pressure and at room temperature with the use of 200 mg. of a palladium-carbon catalyst containing 10% of palladium. When approximately one molecular equivalent of hydrogen has been taken up (which takes about 10 hours), the hydrogenation comes to a standstill. The catalyst is filtered off, and the filtrate is evaporated in a water-jet vacuum. The crude product still displays an extinction of 4400 (about 30% of $\Delta^{14}$-16-ketone) at 233 m/$\mu$; it is chromatographed over 12 grams of alumina (activity II). From the fractions elutriated with benzene and with 9:1 benzene+ethyl acetate, there is obtained by crystallization from methanol a total of 195 mg. of d:1-$\Delta^5$-3-ethylenedioxy-11$\beta$-acetoxy-16:18-dioxo-14-isoandrostene melting at 171–172° C. The fractions elutriated with 2:1 mixtures of benzene and ethyl acetate are evaporated and the residue is crystallized from methylene chloride/ether to yield 40 mg. of d:1-$\Delta^5$-3-ethylenedioxy-11$\beta$-acetoxy-16-oxo-18-hydroxy-14-iso-androstene melting at 226° C.

192 mg. of the above d:1-$\Delta^5$-3-ethylenedioxy-11$\beta$-acetoxy-16:18-dioxo-14-iso-androstene are dissolved in 50 cc. of alcohol, a solution of 800 mg. of potassium carbonate in 25 cc. of water is added and the whole is refluxed for 1.5 hours under nitrogen at a bath temperature of 110° C. The mixture is then cooled, the alcohol removed in a water-jet vacuum, and the aqueous solution is repeatedly extracted with 1:1 mixtures of benzene and ether. The organic extracts are washed with water, dried and evaporated, to yield 173 mg. of a crystalline residue. After recrystallization from acetone+ether and methylene chloride+ether d:1-$\Delta^5$-3-ethylenedioxy-11$\beta$-hydroxy-16:18-dioxo-14-iso-androstene cyclo-semiacetal which melts at 208–211° C. is obtained. Infrared spectrum in methylene chloride: bands at 2.79$\mu$ and 2.95$\mu$ (free and combined hydroxyl); 5.74$\mu$ (16-CO); no further bands between 5.6$\mu$ and 6.5$\mu$; 9.16$\mu$ (ketal).

80 mg. of the above semiacetal are kept for 24 hours at room temperature in 1.0 cc. of absolute pyridine and 0.5 cc. of acetanhydride. The mixture is then poured into 20 cc. of ice water and the white crystalline precipitate is suctioned off after 30 minutes. The crude product (87 mg.) is crystallized from acetone+ether. The pure semiacetal-acetate melts at 183–185° C. Infrared spectrum in methylene chloride: no hydroxyl band; bands at 5.74$\mu$ (strong, ester+16-CO); 8.15$\mu$ (acetate); 9.13$\mu$ (ketal).

135 mg. of the above cyclo-semiacetal of d:1-$\Delta^5$-3-ethylenedioxy - 11$\beta$ - hydroxy - 16:18 - dioxo - 14 - iso-androstene are mixed with a solution of 300 mg. of chromium trioxide in 3 cc. of absolute pyridine with ice cooling and the mixture is stirred for 4 hours at room temperature, then poured into dilute common salt solution and extracted with benzene. The mixture is then filtered through Celite, and the filter residue is thoroughly washed with benzene. The benzolic layer of the filtrate is separated and washed with dilute common salt solution. Each aqueous solution is once more extracted with benzene; the benzolic solutions are combined, dried and evaporated to dryness under diminished pressure. The residue is crystallized from acetone+ether and yields 120 mg. of the 18:11-lactone of d:1-$\Delta^5$-3-ethylenedioxy-11$\beta$-hydroxy-16-oxo-14-iso-androstene-18-acid melting at 196–197° C. Infrared spectrum in methylene chloride: bands at 5.62$\mu$ ($\gamma$-lactone); 5.71$\mu$ (16-CO) and 9.11$\mu$ (ketal).

Example 5

A solution of 10 grams of sodium-boron hydride in 200 cc. 70% methanol is mixed with stirring and cooling with ice water in a current of nitrogen with a solution of 10 grams of d:1-$\Delta^{5:14:18}$-3-ethylenedioxy-11$\beta$:18a-oxido-16-oxo-18a-methyl-18-homo-androstatriene in 140 cc. of tetrahydrofuran and rinsing is performed with 60 cc. of tetrahydrofuran. The cooling bath is then removed and the mixture is further stirred overnight at room temperature in a current of nitrogen, during which crystals separate, which can be dissolved again by adding 200 cc. of water. The mixture is then extensively evaporated in vacuo in a current of nitrogen at a bath temperature of 40–50° C., extracted three times with benzene, and the benzolic solutions are washed three times with water, dried and evaporated in vacuo at 50° C. Finally, the mixture is dried for ½ hour at 50° C. in a high vacuum, then dissolved in 15 cc. of dry pyridine and 70 cc. of chloroform and for 63 minutes, at −15°, an ozonized current of oxygen, capable of yielding 23 mg. of ozone per minute, is caused to react with turbination. The change in color of a test liquid, through which the reacted gases pass, containing 0.5 cc. of 0.02 N-thiosulfate solution, takes place after 54 minutes and 35 seconds. A corresponding third test solution changes color after 1 minute and 20 seconds. Working up is then performed in the manner described in Example 2.

For hydrolysis the crude ozonization product is dissolved in 1 liter of alcohol, mixed with 500 cc. of a potassium carbonate solution of 4% strength, and refluxed for 2 hours in a current of nitrogen. 15 cc. of glacial acetic acid are added, the mixture is extensively evaporated in vacuo in a current of nitrogen at a bath temperature of 55°, 2 N-sodium carbonate solution is added, and the whole is extracted four times with 250 cc. of chloroform. The chloroform solutions are then washed with saturated common salt solution, dried and evaporated in vacuo in a current of nitrogen. Addition of a mixture of benzene, ethyl acetate and ether yields 2.96 grams of the 18:11-cyclo-semiacetal of d:l-$\Delta^{5:14}$-3-ethylenedioxy-11$\beta$:16-dihydroxy-18-oxo-androstadiene in the form of a pale-brown powder. The mother liquor is evaporated and the residue chromatographed over 60 grams of alumina (activity II), and with ethyl acetate and chloroform another 340 mg. of this compound are obtained.

The combined crystallizates (3.3 grams) are treated with 300 cc. of chloroform and oxidized for 5 hours by being stirred at room temperature with 25 grams of activated manganese dioxide. The mixture is filtered through Celite, the filter residue is washed with chloroform and the filtrate is evaporated in vacuo in a current of nitrogen, and the residue is repeatedly dissolved in and crystallized from acetone. The resulting 18:11-lactone of d:l-$\Delta^{5:14}$-3-ethylenedioxy-11$\beta$-hydroxy-16-oxo-androstadiene-18-acid melts at 244–246.5° C. and its ultraviolet spectrum contains: (1) maximum at 221 m$\mu$ ($\epsilon$=10,050), minimum at 228 m$\mu$ ($\epsilon$=8650); (2) maximum at 241 m$\mu$ ($\epsilon$=11,800). In the carbonyl area the infrared spectrum (solvent methylene chloride) displays the following characteristic bands: 5.6$\mu$ ($\gamma$-lactone) and 5.81$\mu$+6.16$\mu$ ($\Delta^{14}$-16-ketone). The residue of the evaporated mother liquor of the lactone described above is dissolved in acetone and filtered through 3 grams of iron-free Norite, and the eluate is evaporated in vacuo. Crystallization from acetone+ether yields 760 mg. of a mixture melting at 177–203° C. which is acetylated overnight with 10 cc. of pyridine and 5 cc. of acetanhydride. The reaction mixture is evaporated in a high vacuum at a bath temperature of 50° C., the residue is dissolved in 5 cc. of benzene and chromatographed over 50 grams of silica gel. A 4:1 mixture of benzene and ethyl acetate at first elutriates a small amount of a compound melting at 222–227° C. after recrystallization from benzene+ether which displays the following infrared spectrum (solvent: methylene chloride): 5.63$\mu$ ($\gamma$-lactone); 5.77$\mu$+8.12$\mu$ (acetate) and 9.10$\mu$ (ketal). The product is probably one of the two 16-isomeric 18:11-lactones of the d:l-$\Delta^{5:14}$-3-ethylenedioxy-11$\beta$-hydroxy-16-acetoxy-androstadiene-18-acids.

According to their infrared spectra the subsequent eluates obtained with 4:1 mixtures of benzene and ethyl acetate consist primarily of the cyclic semiacetal-acetate of d:l-$\Delta^{5:14}$-3-ethylenedioxy-11$\beta$-hydroxy-16:18-dioxo-androstadiene. Towards the end further quantities of the 16-keto-lactone described above are elutriated.

A solution of 239 mg. of the $\Delta^{14}$-16-keto-lactone described above in 150 cc. of absolute ethanol is stirred with 300 mg. of a 10% palladium carbon catalyst under atmospheric pressure and at room temperature in a current of hydrogen. In the course of ½ hour one molecular equivalent of hydrogen is taken up. The reaction mixture is then suction filtered, the filter residue washed with methylene chloride, and the filtrate evaporated to dryness in a water-jet vacuum. Recrystallization of the resulting residue (219 mg.) from methylene chloride+ether yields 200 mg. of the 18:11-lactone of d:l-$\Delta^5$-3-ethylenedioxy-11$\beta$-hydroxy-16-oxo-androstene-18-acid melting at 263–268° C. (I.V.). Infrared spectrum in methylene chloride: bands at 5.65/$\mu$ ($\gamma$-lactone); 5.71/$\mu$ (16-CO);9.14/$\mu$ (ketal). Further processing is performed as described in U.S. Patent Application Serial No. 747,346, filed July 9, 1958.

Example 6

A solution of 150 mg. of osmium tetroxide in 8 cc. of ether is stirred into a solution of 200.4 mg. of d:l-$\Delta^{5:18}$-3-ethylenedioxy-11$\beta$:18a-oxido-16-oxo-18a-methyl-18-homo-androstadiene in 10 cc. of absolute tetrahydrofuran and 0.115 cc. of pyridine, whereupon a precipitate is formed after 40 minutes. The whole is kept for 20 hours at room temperature, diluted with 60 cc. of methanol, a solution of 2 grams of ammonium sulfite in 60 cc. of water is stirred in. The mixture is stirred for 1½ hours, filtered through Celite, and the filter residue is washed with 150 cc. of methanol. The filtrate is extensively evaporated at a bath temperature of 40 to 50° C. in a water-jet vacuum, diluted with saturated common salt solution and extracted once with 30 cc. of chloroform and three times with a 7:3 mixture of chloroform and alcohol. The organic solutions are then washed separately once with 30 cc. of semi-saturated common salt solution, combined, dried and evaporated in vacuo. The crystalline residue is dissolved in 4.8 cc. of methanol and 0.74 cc. of pyridine, and 0.74 cc. of a 0.88-molar periodic acid solution is stirred in. The mixture is kept for 1½ hours, diluted with water and saturated common salt solution and shaken three times with chloroform. The chloroformic solutions are washed with 30 cc. of semi-saturated common salt solution, dried and evaporated in vacuo, and the residue is mixed with a solution of 400 mg. of potassium carbonate in 12 cc. of water and 24 cc. of alcohol. The solution is boiled for 1 hour in a current of nitrogen, allowed to cool, poured into semi-saturated common salt solution and shaken once with chloroform and three times with a 7:3 mixture of chloroform and alcohol. The organic extracts are washed with semi-saturated common salt solution, dried and evaporated in vacuo; the residue is dissolved in 3 cc. of pyridine and with ice cooling stirred into a solution of 100 mg. of chromium trioxide in 3 cc. of pyridine. The mixture is stirred for 3 hours at room temperature, dilute common salt solution and benzene are added, the mixture is vigorously shaken, filtered through Celite, the filter residue is washed with benzene, and the aqueous phase of the filtrate is again extracted with benzene. The organic solutions are then shaken twice with dilute common salt solution, the benzolic solutions are dried and evaporated, and the residue is chromatographed over 3 grams of alumina (activity II). The first benzene eluates contain the 18:11-lactone of d:l-$\Delta^5$-3-ethylenedioxy-11$\beta$-hydroxy-16-oxo-androstene-18-acid which melts at 263–268° C. after having been sublimed at 200° C. in a high vacuum and recrystallized from methylene chloride+ether. It is identical with the compound described in Example 5.

Example 7

210 mg. of d:l-$\Delta^{5:14}$-3-ethylenedioxy-11$\beta$-acetoxy-16:18-dioxo-androstadiene are stirred into 20 cc. of methylethyl dioxolane distilled over lithium-aluminum hydride and 20 mg. of anhydrous ferric chloride. After stirring for 4 days all has passed into solution. The mixture is then poured into dilute sodium bicarbonate solution and twice extracted with benzene. The organic solutions are washed with saturated common salt solution, dried, and evaporated in vacuo, and the residue is chromatographed over 7 grams of alumina (activity II). The benzene fractions contain d:l-$\Delta^{5:14}$-3:18-diethylenedioxy-11$\beta$-acetoxy-16-oxo-androstadiene. After having been recrystallized twice from acetone+ether with the addition of 1 drop of pyridine it melts at 250–253.5° C.

$$\epsilon_{233m/\mu} = 14{,}250$$

Infrared spectrum in methylene chloride: 577$\mu$+8.12$\mu$ (acetate); 5.84$\mu$+5.90$\mu$+6.21$\mu$ ($\Delta^{14}$-16-ketone) and broad bands between 9.03$\mu$ and 9.22$\mu$ (ketals).

Example 8

A mixture of 30 cc. of freshly distilled ethylenedithiol and 15 cc. of absolute benzene is treated with a solution of 0.345 cc. of pyridine in 15 cc. of absolute methanol and 15 cc. of methanolic hydrochloric acid (prepared from 0.3 cc. of acetylchloride and 15 cc. of methanol). 3.08 grams of d:l - $\Delta^{5:14}$ - 3 - ethylenedioxy - 11$\beta$ - acetoxy - 16:18 - dioxo - androstadiene are then stirred in. When all has passed into solution, the mixture is kept for 12 days at room temperature in a sealed vessel, then diluted with benzene, extracted twice with 150 cc. and seven times with 100 cc. of aqueous ammonia of 5% strength and then twice with water, and subsequently the aqueous solutions are shaken once with 200 cc. of ether. The organic solutions are dried and evaporated, and the residue is freed from high-boiling constituents at 60° C. in a high vacuum, then dissolved in 10 cc. of benzene, and chromatographed over 90 grams of alumina (activity II). Recrystallization of the benzene eluates from acetone+ether yields 1.86 grams of d:l-$\Delta^{5:14}$-3-ethylenedioxy-16-ethylenedimercapto-11$\beta$-acetoxy-18-oxo-androstadiene melting at 223–225.5° C. The infrared spectrum (solvent: methylene chloride) contains in the carbonyl area only one strong band at 5.76/$\mu$ (aldehyde+acetate).

A mixture of 410 mg. of the 11$\beta$-acetoxy-thioketal described above, 35 cc. of methanol and 320 mg. of potassium carbonate in 10 cc. of water, sealed in an ampoule in vacuo, is immersed in a boiling methanol bath and stirred for 22 hours with a magnetic stirrer. After 12 hours all has passed into solution. The mixture is allowed to cool slowly to room temperature and then placed in a mixture of ice and common salt. Filtration, washing with ice-cold methanol of 70% strength, water, methanol of 70% strength and ether yields 300 mg. of the 18:11-cyclo-semiacetal of d:l - $\Delta^{5:14}$ - 3 - ethylenedioxy - 11$\beta$-hydroxy - 16 - ethylenedimercapto - 18 - oxo - androstadiene melting at 220–221° C. The infrared spectrum displays a band at 2.79/$\mu$ (hydroxyl) but no bands in the carbonyl area.

The cyclo-semiacetal-acetate prepared from 260 mg. of this cyclo-semiacetal, 4 cc. of pyridine and 4 cc. of acetanhydride melts at 198–200° C. after recrystallization from benzene+ether. Infrared spectrum in methylene chloride: 5.75$\mu$+8.15$\mu$ (acetate) 9.16$\mu$ (ketal).

In the course of 1½ hours a solution of 2.2 grams of mercuric chloride in 9.5 c.c. of acetone is stirred into a mixture of 1.25 grams of the above cyclo-semiacetal-acetate, 30 cc. of acetone, 3 cc. of water and 1.95 grams of mercuric oxide. The whole is stirred for 18 hours at room temperature, filtered through Celite, the filter residue is washed with 750 cc. of acetone. The filtrate is concentrated to a small volume in vacuo at 30° C. bath temperature, then diluted with chloroform, extracted twice with potassium iodide solution of 40% strength and three times with water, and the aqueous solutions are then shaken with chloroform. The organic solutions are dried and evaporated and the residue is chromatographed over 50 grams of silica gel. The 3:1 benzene+ethyl acetate eluates contain d:l-$\Delta^{5:14}$-3-ethylenedioxy-11$\beta$:18-oxido-16-oxo-18-acetoxy-androstadiene. For purification it is dissolved in methanol, treated with 200 mg. of Carboraffin, filtered, the filter residue is washed with methanol, and the filtrate is concentrated and then allowed to crystallize. Yield: 400 mg. of the pure compound melting at 209–210.5° C.

Example 9

10 grams of d:l-$\Delta^{5:14:18}$-3-ethylenedioxy-11$\beta$:18a-oxido-16-oxo-18a-methyl-18-homo-androstatriene are dissolved with gentle heating in 150 cc. of benzene, then treated with 600 cc. of methanol and cooled to 0° C. 20 cc. of ice-cold 4 N-caustic soda solution are added to the resulting clear solution, the whole is thoroughly stirred, and 45 cc. of aqueous hydrogen peroxide of about 30% strength are added. The reaction mixture is left to itself for 24 hours at 0° to 5° C., with about 2.4 grams of natryl hydroxide (NaHO$_2$) separating out in coarse crystals. While keeping the solution strongly stirred, 2.0 grams of 2% palladium+calcium carbonate catalyst are added in small portions and stirring is continued until no more oxygen escapes and no more hydrogen peroxide can be detected. When this point has been reached, the mixture is suction filtered, and the filter residue is washed with methylene chloride. 40 cc. of 2 N-acetic acid are added to the colorless filtrate and the whole is very extensively evaporated (160 to 100 cc.) under reduced pressure. Crystallization of the epoxide sets in in the course of the evaporation. To complete the precipitation, 1 liter of water is added, and the mixture is kept overnight at 0 to 5° C. The crystals are then suctioned off, thoroughly washed with water and dried in vacuo over phosphorus pentoxide. Yield: 9.0 grams of d:l-$\Delta^{5:18}$-3-ethylenedioxy-11$\beta$:18a; 14:15-dioxido-16-oxo-18a-methyl-18-homo-androstadiene melting at 182–196° C. This product is sufficiently pure for treatment with osmium tetroxideperiodate. A specimen of the epoxide, recrystallized from methanol and benzene+hexane, melts at 199–201° C. Infrared spectrum in methylene chloride: bands at 5.72$\mu$ (16-CO); 5.96$\mu$ (enol ether) and 9.16$\mu$ (ketal).

380 mg. of the above ketal epoxide in 6.4 cc. of glacial acetic acid and 5 cc. of water are immersed in a current of nitrogen for 15 minutes in a bath kept at 100° C., then evaporated in vacuo, benzene is added, the whole is again evaporated in vacuo, and the residue is repeatedly recrystallized from a mixture of benzene+ether+petroleum ether. The resulting d:l-$\Delta^{4:18}$-3:16-dioxo-11$\beta$:18a; 14:15-dioxido-18a-methyl-18-homo-androstadiene melts at 226–233° C. Characteristic bands of the infrared spectrum (solvent: methylene chloride): 5.72$\mu$ (5-ring-CO); 5.98$\mu$ (3CO+dihydropyran) and 6.17$\mu$ ($\Delta^4$-double bond).

A solution of 7.00 grams of d:l-$\Delta^{5:18}$-3-ethylenedioxy-11$\beta$:18a; 14:15-dioxido - 16 - oxo - 18a-methyl-18-homo-androstadiene in 350 cc. of tetrahydrofuran is first mixed with stirring with a solution of 7.88 grams of sodium periodate in 70 cc. of water, then with 7.88 grams of crystalline sodium acetate and finally with 70 mg. of osmium tetroxide. The tea-colored mixture which contains undissolved sodium acetate is stirred for 24 hours at room temperature, a white, flocculent precipitate separating out after a short time. After termination of the reaction time the reaction mixture is suction filtered, the filter residue thoroughly washed with methylene chloride, and as much as possible of the organic solvents is removed from the filtrate under reduced pressure at 35° C. bath temperature. The precipitate is suctioned off, thoroughly washed with water and dried in vacuo over phosphorus pentoxide to yield 7.27 grams of crude d:l-$\Delta^5$-3-ethylenedioxy-11$\beta$:18a; 14:15-dioxido-16-oxo-18:18a-dihydroxy-18a-methyl-18-homo-androstene melting at 174–178° C. If desired, the subsequent periodic acid cleavage can alternatively be performed with the washed, moist crude product. On recrystallization from methylene chloride+methanol a compound is obtained which melts at 184–187° C. When the product is formed by oxidation with a molar proportion of osmium tetroxide a melting point of 200–202° C. may occasionally be observed. The infrared spectra of the two modifications are identical. Infrared spectrum in Nujol: bands at 2.89µ (hydroxyl), 5.71µ (16-CO) and 9.15µ (ketal).

The same compound can alternatively be obtained as follows:

4.82 grams of d:1-$\Delta^{5:18}$-3-ethylenedioxy-11β:18; 14:15-dioxido - 16 - oxo-18a-methyl-18-homo-androstadiene are dissolved in 100 cc. of tetrahydrofuran and cooled in ice, and in the course of 15 minutes a solution of 3.18 grams of osmium tetroxide in 100 cc. of ether is stirred in dropwise, and the mixture is then kept for 24 hours at room temperature. 600 cc. of methanol and then a solution of 25 grams of ammonium sulfite in 600 cc. of water are then added, and the whole is stirred for 2¾ hours at room temperature. The mixture is suction filtered through a glass frit, the filter residue washed with 200 cc. of methanol, and the turbid filtrate concentrated to about 500 cc. with stirring under reduced pressure. The product is then repeatedly extracted with a 7:3 mixture of chloroform+alcohol. The extracts are washed with saturated common salt solution, combined, dried and evaporated to yield 4.01 grams of crude, crystalline d:1 - $\Delta^5$ - 3-ethylenedioxy-11β:18a; 14:15-dioxido-16-oxo-18:18a - dihydroxy-18a-methyl-18-homo-androstene. A specimen recrystallized from methylene chloride melts at 200–202° C.

7.27 grams of the crude 18:18a-diol described above are suspended in a mixture of 180 cc. of dioxane and 3 cc. of pyridine and treated with 30 cc. of a molar solution of periodic acid. The whole is then stirred for 8 hours at room temperature, treated with 350 cc. of methylene chloride and washed twice with 220 cc. of water on each occasion. The aqueous solutions are again shaken with 220 cc. of methylene chloride, and the methylene chloride solutions are combined dried and then evaporated in vacuo. Crystallization of the crude product from methylene chloride+ether yields 6.94 grams of d:1 - $\Delta^5$ - 3-ethylenedioxy-11β-acetoxy-14:15-oxido-16:18-dioxo-androstene melting at 188–189° C. The mother liquor yields another 0.36 gram of a slightly less pure product.

*Example 10*

A solution of 3.0 grams of d:1-$\Delta^{5:18}$-3-ethylenedioxy-11β:18a;14:15 - dioxido - 16 - oxo - 18a-methyl - 18-homo-androstadiene in 10 cc. of dry pyridine and 60 cc. of chloroform is treated at —17° for 26.5 minutes with turbination with an ozonized current of oxygen capable of yielding 16.3 mg. of ozone per minute. The reduction of the ozonide and processing are performed as described in Example 2 with 10 cc. of glacial acetic acid, 10 cc. of water, 20 cc. of pyridine and about 10 grams of zinc dust. The crude product is chromatographed in benzene over 60 grams of alumina (activity II), the middle benzene eluates yielding 320 mg. of d:1-$\Delta^5$-3-ethylenedioxy - 11β - acetoxy - 14:15 - oxido - 16:18 - dioxo-androstene, melting at 176–181° C., in crystalline form. After recrystallization from benzene+ether the melting point rises to 188–189° C. Infrared spectrum in methylene chloride: bands at 3.70µ (aldehyde); 5.72µ and 5.76µ (16-CO, aldehyde+ester); 8.17µ (acetate) and 9.13µ (ketal).

*Example 11*

A solution of 11.24 grams of d:1-$\Delta^{5:18}$-3-ethylenedioxy-11β:18a;14:15 - dioxido - 16 - oxo - 18a - methyl - 18-homo-androstadiene in a mixture of 340 cc. of dioxane, 4.7 cc. of pyridine and 70 cc. of water is treated with stirring with 75 mg. of osmium tetroxide, and 6.0 grams of sodium periodate are then added. The mixture is stirred for 5½ hours at room temperature, another 75 mg. of osmium tetroxide and 4.5 grams of sodium periodate are added, and after a further 5 hours again 75 mg. of osmium tetroxide and 3.0 grams of sodium periodate are added. Finally, the mixture is stirred on for 9 hours and then poured into 500 cc. of water, extracted once with 500 cc. and twice with 350 cc. of methylene chloride on each occasion, and the extracts are washed twice with 350 cc. of water on each occasion. The methylene chloride extracts are combined, dried and evaporated to yield 14.22 grams of a residue which crystallizes from ether; it is dissolved in a mixture of equal volumes of benzene and hexane and chromatographed over 225 grams of alumina (activity II). 5.4 liters of a 1:1 mixture of benzene and hexane elutriate a total of 4.278 grams of starting material which melts at 201–203° C. after recrystallization from methylene chloride+methanol. 900 cc. of benzene elutriate 876 mg. of a non-unitary product. The fractions elutriated with 1.8 liters of ethyl acetate are evaporated and the residue is triturated with ether, yielding 5.834 grams of a product melting at 173–181° C. According to its infrared spectrum and paper-chromatographic analysis it is almost pure d:1-$\Delta^5$-3-ethylenedioxy-11β-acetoxy-14:15-oxido-16:18-dioxo-androstene.

*Example 12*

1.0 gram of d:1-$\Delta^5$-3-ethylenedioxy-11β-acetoxy-14:15-oxido-16:18-dioxo-androstene is suspended in a mixture of 10 cc. of absolute methanol and 10 cc. of absolute tetrahydrofuran, cooled to 0° C., and 4.8 cc. of a 0.5 N-solution of sodium methylate in absolute methanol is added. The whole is then stirred until a clear solution is achieved (about 15 minutes) which is then kept for 50 to 60 hours at 0 to 5° C. with exclusion of moisture. 0.5 cc. of glacial acetic acid and 0.5 cc. of pyridine are then added, and the solution is concentrated at room temperature under reduced pressure to about 5 cc. The whole is then diluted with water, extracted twice with methylene chloride, and the extracts are washed once with water. The combined methylene chloride extracts are evaporated to yield 1.08 grams of a crystalline residue which is recrystallized from methylene chloride+ether and yields a total of 638 mg. of the 18:11-cyclosemiacetal of d:1-$\Delta^5$-3-ethylenedioxy-11β-hydroxy-14:15-oxido-16:18-dioxo-androstene melting at 243–248° C. A specimen recrystallized from methylene chloride+methanol melts at 251–254° C. Infrared spectrum in methylene chloride: bands at 2.79µ (hydroxyl); 5.70µ (16-CO) and 9.15µ (ketal).

The acetate is advantageously prepared from the crude hydrolysis product: 4.277 grams of the crude hydrolysis product are kept for 48 hours at room temperature in 30 cc. of pyridine and 20 cc. of acetanhydride, and during this time some of the acetate begins to crystallize out. The whole is then evaporated to dryness in a water-jet vacuum, and the residue is repeatedly dissolved in benzene and again evaporated each time. The crude product is triturated with ether, the pure acetate (2.214 grams) remaining undissolved. Melting point 245–253° C.

The pure acetate crystallizes from methylene chloride+methanol in prismatic form; above 220° the prisms are turned into long needles which melt at 249–252° C. Infrared spectrum in methylene chloride: bands at 5.70µ with a shoulder at 5.73µ (ester-CO and 16-CO); 8:13µ (acetate) and 9.15µ (ketal).

While cooling with ice, 0.2 cc. of freshly distilled benzoyl chloride is stirred into a solution of 200 mg. of the 18:11-cyclo-semiacetal of d:1-$\Delta^5$-3-ethylenedioxy-11β-hydroxy-14:15-oxido-16:18-dioxoandrostene in 9 cc. of benzene and 1 cc. of pyridine. After 2 hours cooling with ice is discontinued, and the reaction mixture is left to itself overnight at room temperature, then poured into benzene and water and extracted twice with 0.1 N-sodium bicarbonate solution and three times with water. The aqueous solutions are then shaken twice with fresh benzene. The organic solutions are dried and evaporated, and the residue is repeatedly recrystallized from a mixture of methylene chloride, acetone and ether. The resulting cyclo-semiacetal benzoate melts at 258.5–264.5° C. and displays the following characteristic bands in the infrared spectrum: $5.69\mu$ (5-ring-CO); $5.78\mu$ (benzoate) and $9.15\mu$ (ketal).

Example 13

1.538 grams of d:l-$\Delta^5$-3-ethylenedioxy-11$\beta$:18;14:15-dioxido-16-oxo-18-acetoxy-androstene are stirred in the presence of 1.0 gram of 10% palladium+calcium carbonate catalyst in 240 cc. of absolute ethanol under hydrogen. When the amount of hydrogen calculated for one molecular equivalent has been taken up (after 9 hours), the hydrogenation is discontinued, and the catalyst is filtered off and washed with methylene chloride. Evaporation of the filtrate in vacuo yields 1.551 grams of a product which crystallizes readily from methylene chloride+ether. The crude product can be used directly for the elimination of water.

A specimen of d:l-$\Delta^5$-3-ethylenedioxy-11$\beta$:18-oxido-14-hydroxy-16-oxo-18-acetoxy-androstene, recrystallized twice from methylene chloride+ether, melts at 201.5–203.5° C.

Infrared spectrum in methylene chloride: bands at $2.77\mu$ and $2.87\mu$ (free and combined hydroxyl); $5.73\mu$ (ester-CO and 16-CO) and $8.13\mu$ (acetate).

300 mg. of the cyclo-semiacetal-acetate described above are heated for 25 minutes at 100° C. in a mixture of 7.5 cc. of glacial acetic acid and 7.5 cc. of water. This solution is cooled, poured into 75 cc. of water and extracted three times with a 2:1 mixture of chloroform and alcohol, 100 cc. thereof being used on each occasion. The extracts are shaken with sodium bicarbonate solution and then with saturated common salt solution, dried and evaporated in vacuo, yielding a crystalline residue (300 mg.) from which by crystallization form methylene chloride+methanol a first fraction is obtained of 188 mg. of the cyclo-semiacetal of d:l-$\Delta^4$-3:16:18-trioxo-11$\beta$:14$\beta$-dihydroxyandrostene melting at 239–240° C. A further amount of a slightly less pure substance separates from the mother liquor. The compound retains the solvent very stubbornly. When dried at a high temperature, it turns brown with decomposition. Ultraviolet spectrum: maximum at 240 m$\mu$ ($\epsilon$=16,150). Infrared spectrum in Nujol: bands at $2.96\mu$ (hydroxyl); $5.77\mu$ (16-CO); $5.98\mu$ and $6.18\mu$ ($\alpha$:$\beta$-unsaturated ketone).

2.51 grams of crude d:l-$\Delta^5$-3-ethylenedioxy-11$\beta$:18-oxido - 14 - hydroxy - 16 - oxo - 18 - acetoxy - androstene are dissolved in 480 cc. of absolute benzene, 12.0 grams of "neutral" alumina (product of Messrs. Woelm; activity I) are added, and the mixture is refluxed for 2 hours while being stirred and with exclusion of moisture at 110° C. bath temperature, then cooled. The alumina, which by then has turned red, is suctioned off and thoroughly washed on the filter with methylene chloride. The filtrate is evaporated in vacuo, and the residue (2.22 grams, extinction at 232 m$\mu$:14,300) is crystallized from ether to yield 1.63 grams of d:l-$\Delta^{5,14}$-3-ethylenedioxy-11$\beta$:18-oxido-16-oxo-18-acetoxy-androstadiene melting at 209–210.5° C. Ultraviolet spectrum: $\epsilon_{232m\mu}$= 16,600. Infrared spectrum in methylene chloride: bands at $5.75\mu$ (ester-CO); $5.84\mu$ with shoulder at $5.90\mu$ and $6.19\mu$ ($\Delta^{14}$-16-ketone); $8.18\mu$ (acetate) and $9.08\mu$–$9.16\mu$ (ketal).

When the mother liquor is concentrated and allowed to stand for a prolonged period, a further quantity of a slightly less pure product crystallizes out.

Example 14

22.0 mg. of d:l-$\Delta^5$-3-ethylenedioxy-11$\beta$:18-oxido-14-hydroxy-16-oxo-18-acetoxy-androstene and 11.2 mg. of benzoic acid in 2.0 cc. of absolute xylene are mixed with 0.08 cc. of a solution of triethylamine in xylene (containing 1.0 cc. of triethylamine in 10.0 cc. of solution) and refluxed for 12 hours under nitrogen at 160° C. bath temperature, then allowed to cool, diluted with benzene and washed with water, sodium bicarbonate solution and water, and the aqueous solutions are separately extracted twice with benzene. The benzene solutions are combined and dried and yield 28 mg. of crude product which displays an extinction of 11,600 at 231 m$\mu$. Crystallization from ether yields 8.9 mg. of crystals melting at 207–209° C. which, after having been once more recrystallized from ether, melt at 217–220.5° C. Analysis and infrared spectrum reveal that the product is d:l - $\Delta^5$ - 3 - ethylenedioxy - 11$\beta$:18 - oxido - 14 - hydroxy-16-oxo-18-benzoyloxy-androstene. Ultraviolet spectrum: $\epsilon_{231\ m\mu}$=12,100. Infrared spectrum in methylene chloride: bands at $2.77\mu$ and $2.86\mu$ (free and combined hydroxyl); $5.72\mu$ (16-CO); $5.79\mu$ (benzoate) and $9.12\mu$ (ketal).

From the mother liquor of the first crystallization a further 6.3 mg. of crystalline product are obtained; according to its mixed melting point and infrared spectrum it is identical with the d:l-$\Delta^{5,14}$-3-ethylenedioxy-11$\beta$:18 - oxido - 16 - oxo - 18 - acetoxy - androstadiene described above.

Example 15

500 mg. of pure d:l-$\Delta^{5,14}$-3-ethylenedioxy-11$\beta$:18-oxido-16-oxo-18-acetoxy-androstadiene are hydrogenated in 150 cc. of absolute ethanol with 500 mg. of 10% palladium + calcium carbonate catalyst under atmospheric pressure at room temperature. The hydrogenation is discontinued when one molecular equivalent of hydrogen has been taken up (after about 7 hours). The catalyst is filtered off, the filtrate evaporated, and the residue is sprinkled with ether to cause complete crystallization. Melting point 212–226° C. After recrystallization from methylene chloride+ether the resulting d:l-$\Delta^5$-3-ethylenedioxy - 11$\beta$:18 - oxido - 16 - oxo - 18 - acetoxyandrostene sublimes above 220° C. slowly to form small cubes melting at 243–246° C. Infrared spectrum in methylene chloride: bands at $5.74\mu$ (16-CO and ester); $8.18\mu$ (acetate) and $9.11\mu$ (ketal).

A solution of 410 mg. of this acetate in 65 cc. of methanol is mixed with a solution of 540 mg. of potassium carbonate in 17.5 cc. of water and kept for 20 hours at room temperature. 0.22 cc. of glacial acetic acid, 50 cc. of water and 200 cc. of saturated common salt solution are then added, and the mixture is extracted once with chloroform and three times with 70 cc. of a 7:3 mixture of chloroform and alcohol. The organic solutions are dried and evaporated, and the residue is recrystallized twice from methylene chloride+ether. The d:l-$\Delta^5$-3-ethylenedioxy-11$\beta$-hydroxy-16:18-dioxo-androstene cyclo-semiacetal obtained in this manner melts at 253–258° C. The infrared spectrum (solvent: methylene chloride) displays the following characteristic bands: $2.78\mu$ (hydroxyl); $5.73\mu$ (5-ring-CO) and $9.12\mu$ (ketal).

250 mg. of the d:l-$\Delta^5$-3-ethylenedioxy-11$\beta$-hydroxy-16:18-dioxo-androstene cyclo-semiacetal described above are dissolved with heating in 6 cc. of glacial acetic acid. 6 cc. of water are added, and the mixture is heated for 30 minutes at 100° C. in a current of nitrogen, then evaporated in vacuo and the last traces of glacial acetic acid and water are removed by two additions of benzene and evaporation in vacuo. The residue, the cyclo-semiacetal of d:l-$\Delta^4$-3:16:18-trioxo-11$\beta$-hydroxy-androstene, is repeatedly recrystallized from a mixture of methanol, methylene chloride and ether, and melts then at 242–246° C. Characteristic bands of the infrared spectrum in Nujol: $2.85\mu$ (hydroxyl); $5.73\mu$ (5-ring-CO) and $6.05\mu$+$6.20\mu$ ($\Delta^4$-3-ketone). $\epsilon_{240\ m\mu}$=16,500.

90 mg. of the cyclo-semiacetal of d:l-$\Delta^5$-3-ethylenedioxy-11$\beta$-hydroxy-16:18-dioxo-androstene are stirred with ice cooling into a mixture of 100 mg. of chromium trioxide and 3 cc. of pyridine. After 15 minutes the ice cooling is discontinued, the mixture is stirred for another 4 hours at room temperature, and benzene and semi-saturated common salt solution are added. The whole is filtered through Celite, the filter residue washed with benzene, the aqueous phase of the filtrate is extracted twice with benzene, and the benzolic solutions are shaken three times with semi-saturated common salt solution. The organic solutions are dried and evaporated, and the residue is recrystallized repeatedly from acetone+ether and pure acetone. It melts at 259–266° C. and is identical with the 18:11-lactone of d:l-$\Delta^5$-3-ethylenedioxy-16-oxo-11$\beta$-hydroxy-androstene-18-acid described in Example 5.

*Example 16*

150 mg. of the free cyclo-semiacetal of d:l-$\Delta^5$-3-ethylene-dioxy - 11$\beta$ - hydroxy - 14:15 - oxido-16:18-dioxo-androstene are hydrogenated—as described for the acetate in Example 13—with 100 mg. of 10% palladium+calcium carbonate catalyst in 25 cc. of absolute ethanol. Crystallization of the crude product from a mixture of methylene chloride, methanol and ether yields 124 mg. of d:l-$\Delta^5$-3-ethylenedioxy-11$\beta$:14-dihydroxy-16:18-dioxoandrostene cyclo-semiacetal melting at 247–249° C. (with decomposition). Infrared spectrum in Nujol: bands at 2.88$\mu$ and 2.94$\mu$ (hydroxyl); 5.74$\mu$ (16-CO) and 9.16$\mu$ (ketal).

50 mg. of this cyclo-semiacetal are acetylated overnight in 2 cc. of pyridine and 1 cc. of acetanhydride, then diluted with 10 cc. of absolute benzene, 2.0 cc. of methanol are added, and after 2 hours the reaction mixture is worked up in the usual manner. Crystallization of the crude product (67 mg.) from methylene chloride+ether yields 40 mg. of d:l-$\Delta^5$-3-ethylenedioxy-11$\beta$:18-oxido-14-hydroxy-16-oxo-18-acetoxy-androstene; according to its melting point, mixed melting point and infrared spectrum it is identical with the compound described in Example 13.

*Example 17*

2 cc. of acetyl chloride are stirred into a mixture of 200 cc. of dry benzene, 2.3 cc. of absolute pyridine and 2 cc. of absolute methanol. After 20 minutes 16 grams of d:l-$\Delta^5$-3-ethylene-dioxy - 11$\beta$-hydroxy - 14:15 - oxido-16:18-dioxo-androstene cyclo-semiacetal and 250 cc. of dihydropyran are added. The whole is stirred for 96 hours at room temperature with exclusion of moisture, then diluted with benzene and extracted with dilute sodium bicarbonate solution and three times with water. The aqueous solutions are shaken twice with benzene, and the organic solutions are then combined, dried, and evaporated in vacuo at 50° C. Readily volatile constituents are removed at 50° C. in a high vacuum, and the residue is dissolved in benzene and filtered through 80 grams of alumina (activity II). The first 2 liters of the filtrate contain d:l-$\Delta^5$-3-ethylenedioxy-11$\beta$:18;14:15-dioxido-16-oxo-18-tetrahydropyranyloxy-androstene in the form of a mixture of the stereoisomers. A first crystallization from methylene chloride+ether yields 15.24 grams of a product melting at 193–201° C. (with decomposition). The infrared spectrum in methylene chloride no longer contains a hydroxyl band. In the carbonyl area only the 5-ring-ketone band is observed at 5.7$\mu$. 10.21 grams of the d:l-$\Delta^5$-3-ethylenedioxy-11$\beta$:18;14:15-di-oxido-16-oxo - 18-tetrahydropyranyloxy-androstene described above in 800 cc. of absolute ethanol are mixed with 5.0 grams of 10% palladium+calcium carbonate catalyst and shaken until 1 molecular equivalent of hydrogen has been taken up. The catalyst is then filtered off, washed on the filter with methylene chloride, and the filtrate is evaporated to dryness in a water-jet vacuum. The resulting crude d:l-$\Delta^5$-3-ethylenedioxy-11$\beta$:18 - oxido - 14 - hydroxy-16-oxo-18-tetrahydropyranyloxy-androstene can be used as it is for the elimination of water described below. A specimen of the pure 14-hydroxy compound, recrystallized from methylene chloride+ether melts at 184–186° C. Infrared spectrum in methylene chloride: 2.78$\mu$+2.85$\mu$ (hydroxyl) and 5.73$\mu$ (5-ring ketone).

10.30 grams of the above crude 14-hydroxy compound are dissolved in 1 liter of absolute benzene and refluxed for 3 hours while being stirred with 30 grams of neutral alumina (activity I) in a current of nitrogen. After cooling, the alumina is suctioned off, washed on the filter with 300 cc. of benzene, and the pale-yellow filtrate is evaporated to dryness in a water-jet vacuum. Crystallization of the residue (9.4 grams) from ether yields in two fractions a total of 8.23 grams of pure d:l-$\Delta^{5\cdot14}$-3-ethylenedioxy - 11$\beta$:18-oxido-16-oxo - 18 - tetrahydropyranyloxy-androstadiene. After having been again recrystallized from ether, the compound melts at 161–163° C. Ultraviolet spectrum: maximum at 236 m$\mu$ ($\epsilon$=16,300). Infrared spectrum in methylene chloride: 5.85$\mu$+6.20$\mu$ ($\Delta^{14}$-16-ketone).

100 mg. of the 18:11-semiacetal of d:l-$\Delta^5$-3-ethylene-dioxy-11$\beta$-hydroxy-14:15-oxido - 16:18 - dioxo - androstene, used as starting material in the foregoing example, are suspended in 20 cc. of glacial acetic acid and immersed in an oil bath kept at 100° C. After 2 minutes 1.0 cc. of water is added to the clear solution. After another 5 minutes at 100° C. the whole is poured into 30 cc. of water, repeatedly extracted with methylene chloride, and the extracts are washed with dilute sodium bicarbonate solution until neutral. The methylene chloride solutions are combined and dried and yield 84 mg. of a crystalline residue. Recrystallization from methylene chloride+ether yields the pure 18:11-semiacetal of d:l-$\Delta^4$-3:16:18-trioxo-11$\beta$-hydroxy-14:15-oxido - androstene melting at 244–246.5° C. (with decomposition). Ultraviolet spectrum: maximum at 238 m$\mu$ ($\epsilon$=15,200). Infrared spectrum in Nujol: 2.98$\mu$ (hydroxyl); 5.73$\mu$ (5-ring-ketone) and 5.95$\mu$+6.18$\mu$ ($\Delta^4$-3-ketone).

Proceeding in exactly identical manner, reaction of the 18-tetrahydropyranyl ether with the 18-acetate of the semiacetal described in Example 16 yields the same semiacetal of d:l-$\Delta^4$-3:16:18-trioxo-11$\beta$-hydroxy-14:15-oxido-androstene melting at 244–246.5° C.

*Example 18*

100 mg. of d:l-$\Delta^{5\cdot14}$-3-ethylenedioxy - 16 - oxo-11$\beta$:18-oxido-18-tetrahydropyranyloxy-androstadiene are stirred with 25 cc. of absolute ethanol and 10 mg. of a 10% palladium+calcium carbonate catalyst in a current of hydrogen until the quantity of hydrogen required to saturate the 14:15-double bond has been taken up. The catalyst is then filtered off, washed on the filter with benzene, and the filtrate is evaporated to dryness in vacuo. After recrystallization from methylene chloride+ether the resulting d:l-$\Delta^5$-3-ethylenedioxy-16-oxo - 11$\beta$:18 - oxido-18-tetrahydro-pyranyloxy-androstene melts at 213–219° C. Infrared spectrum in methylene chloride: 5.74$\mu$ (5-ring-ketone) and 9.12$\mu$ (ketal).

75 mg. of the hydrogenation product obtained as described above are heated for 30 minutes at 100° C. in a current of nitrogen with 10 cc. of glacial acetic acid of 50% strength. The mixture is then evaporated in vacuo, the residue is taken up in benzene, once more evaporated, and the whole operation is repeated once more. Recrystallization of the residue from methanol+ether yields the cyclo-semiacetal of d:l-$\Delta^4$-3:16:18-trioxo - 11$\beta$ - hydroxy-androstene which gives no melting point depression with the product described in Example 15 and has an identical infrared spectrum.

What is claimed is:

1. Process for the manufacture of 11:18-dioxygenated 16-oxoandrostane compounds, wherein in a member selected from the group consisting of a $\Delta^{4\cdot18}$-3:16-dioxo-11$\beta$:18a-oxido-18a-methyl-18-homo-androstadiene and a 3-ketal thereof, the 18:18a-double bond is subjected to oxidative cleavage by ozonization and reductive splitting of the ozonides, and the 11$\beta$-acetoxy group in the resulting 11$\beta$-acetoxy-18-oxo compound is hydrolyzed in an alkaline medium.

2. A process of claim 1, wherein the androstadiene starting material contains a carbon to carbon double bond in the 14:15 position.

3. A process of claim 2, wherein the carbon to carbon double bond is temporarily protected during the reaction.

4. A process of claim 2, wherein the 16-oxo group is temporarily protected during the reaction.

5. Process wherein hydrogen peroxide is caused to react with the $\Delta^{5:14:18}$-3-ethylenedioxy-11$\beta$:18a-oxido-16-oxo-18a-methyl-18-homo-androstatriene in alkaline solution, the 18:18a-double bond in the resulting 14:15-epoxide is subjected to oxidative cleavage by ozonization and reductive splitting of the ozonides, the resulting 11$\beta$-acetoxy group is hydrolyzed with sodium methoxide, the resulting cyclosemiacetal is treated with a member selected from the group consisting of esterifying and etherifying agents, the product obtained is hydrogenated in the presence of a palladium catalyst and water is split off from the resulting 14-hydroxy compound.

6. Process wherein hydrogen peroxide is caused to react with the $\Delta^{5:14:18}$-3-ethylenedioxy-11$\beta$:18$\alpha$-oxido-16-oxo-18$\alpha$-methyl-18-homo-androstatriene in alkaline solution, the 18:18$\alpha$-double bond in the resulting 14:15-epoxide is subjected to oxidative cleavage by hydroxylation of the enol double bond with a member selected from the group consisting of osmium tetroxide, potassium permanganate and an alkali metal perhalate and splitting up the diol formed with a member selected from the group consisting of periodic acid, lead tetraacetate and sodium bismuthate, the resulting 11$\beta$-acetoxy group is hydrolyzed with sodium methoxide, the resulting cyclosemiacetal is treated with a member selected from the group consisting of esterifying and etherifying agents, the product obtained is hydrogenated in the presence of a palladium catalyst and water is split off from the resulting 14-hydroxy compound.

7. Process according to claim 6, wherein the 18:18a-double bond is split up with sodium periodate in the presence of pyridine and a catalytic quantity of osmium tetroxide.

8. Process according to claim 6, wherein the 18:18a-double bond is first hydroxylated and the resulting 18:18a-diol split up with periodic acid.

9. Process according to claim 8, wherein the 18:18a-double bond is hydroxylated with sodium periodate in the presence of sodium acetate and a catalytic quantity of osmium tetroxide.

10. $\Delta^{5:14}$-3-ethylenedioxy-11$\beta$-acetoxy-16:18-dioxo androstadiene.

11. $\Delta^5$-3-ethylenedioxy-11$\beta$-acetoxy-14:15-oxido-16:18-dioxo-androstene.

12. A compound selected from the group consisting of $\Delta^4$-3:16:18-trioxo-11$\beta$-hydroxy-androstene and its 18:11-cyclohemiacetal.

13. Compounds selected from the group consisting of those of the formula

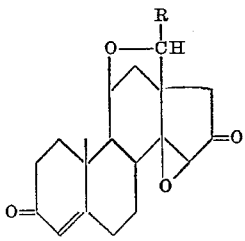

wherein R represents a member selected from the group consisting of a free hydroxyl group, an esterified hydroxyl group derived from an acid selected from the group consisting of a lower aliphatic carboxylic acid, a lower monocyclic araliphatic acid and a monocyclic carbocyclic carboxylic acid, and an etherified hydroxyl group derived from an alcohol selected from the group consisting of a lower alkanol, monocyclic aralkanol and $\alpha$-pyranol, and 3-ketals thereof.

14. $\Delta^5$-3-ethylenedioxy-11$\beta$:18;14:15-bis-oxido-16-oxo-18-tetrahydropyranyloxy-androstene.

15. Compounds selected from the group consisting of those of the formula

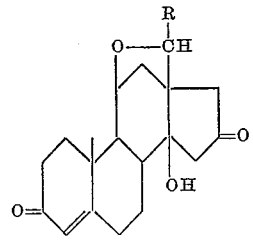

wherein R is a member selected from the group consisting of a free hydroxyl group, an esterified hydroxyl group derived from an acid selected from the group consisting of a lower aliphatic carboxylic acid, a lower monocyclic araliphatic acid and a monocyclic carbocyclic carboxylic acid, and an etherified hydroxyl group derived from an alcohol selected from the group consisting of a lower alkanol, monocyclic aralkanol and $\alpha$-pyranol, and 3-ketals thereof.

16. $\Delta^5$-3-ethylenedioxy-11$\beta$:18-oxido-14-hydroxy-16-oxo-18-tetrahydropyranyloxy-androstene.

17. Compounds selected from the group consisting of those of the formula

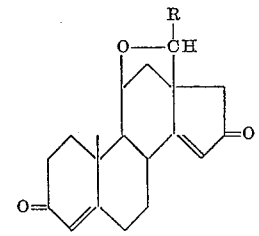

wherein R is a member of the group consisting of a free hydroxyl group, an esterified hydroxyl group derived from an acid selected from the group consisting of a lower aliphatic carboxylic acid, a lower monocyclic araliphatic acid and a monocyclic carbocyclic carboxylic acid, and an etherified hydroxyl group derived from an alcohol selected from the group consisting of a lower alkanol, monocyclic aralkanol and $\alpha$-pyranol, and 3-ketals thereof.

18. $\Delta^{5:14}$-3-ethylenedioxy-11$\beta$:18-oxido-16-oxo-18-tetrahydropyranyloxy-androstadiene.

19. $\Delta^{5:14}$-3-ethylenedioxy-11$\beta$:18-oxido-16-oxo-18-acetoxy-androstadiene.

20. Compounds selected from the group consisting of those of the formula

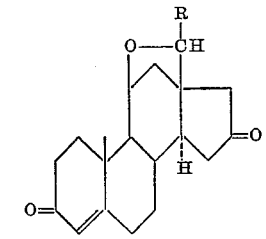

wherein R is a member selected from the group consisting of a free hydroxyl group, an esterified hydroxyl group derived from an acid selected from the group consisting of a lower aliphatic carboxylic acid, a lower monocyclic araliphatic acid and a monocyclic carbocyclic carboxylic acid, and an etherified hydroxyl group derived from an alcohol selected from the group consisting of a lower alkanol, monocyclic aralkanol and $\alpha$-pyranol, and 3-ketals thereof.

21. $\Delta^5$-3-ethylenedioxy-11$\beta$:18-oxido-16-oxo-18-tetrahydropyranyloxy-androstene.

22. $\Delta^5$-3-ethylenedioxy-11$\beta$:18-oxido-16-oxo-18-acetoxy-androstene.

23. The 18:11-lactone of Δ$^{5:14}$-3-ethylenedioxy-11β-hydroxy-16-oxo-androstadiene-18-acid.

24. The 18:11-lactone of Δ$^{5}$-3-ethylenedioxy-11β-hydroxy-16-oxo-androstadiene-18-acid.

25. A 16-oxo-androstene compound selected from the group consisting of those of the formula

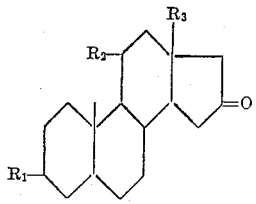

having a double bond extending from the 5-carbon atom, wherein $R_1$ stands for a member selected from the group consisting of a free and a ketalized oxo group, $R_2$ stands for a member selected from the group consisting of a free hydroxyl group, an esterified hydroxyl group, a hydroxy group acetalized with an aldehyde group in the 13-position, a hydroxy group lactonized with a carboxyl group in the 13-position and an oxo group, $R_3$ stands for a member selected from the group consisting of an aldehyde group, an aldehyde group semiacetalized with an 11-hydroxyl group, an ester and an ether of such cyclosemiacetal group, the ester being derived from an acid selected from the group consisting of a lower aliphatic carboxylic acid, a lower monocyclic araliphatic acid and a monocyclic carbocyclic acid and the ethers being derived from an alcohol selected from the group consisting of a lower alkanol, monocyclic aralkanol and α-pyranol; a carboxyl group, a carboxyl group lactonized with an 11-hydroxyl group, and their derivatives having a double bond also in the 14:15-position.

26. Process for the manufacture of 11:18-dioxygenated 16-oxo-androstane compounds, wherein in a member selected from the group consisting of a Δ$^{4:18}$-3:16-dioxo-11β:18α-oxido-18α-methyl-18-homo-androstadiene and a 3-ketal thereof, the 18:18α-double bond is subjected to oxidative cleavage by treatment with hexavalent chromium, and the 11β-acetoxy group in the resulting 11β-acetoxy-18-oxo compound is hydrolyzed in an alkaline medium.

27. A process of claim 26, wherein the androstadiene starting material contains a carbon to carbon double bond in the 14:15 position.

28. A process of claim 27, wherein the carbon to carbon double bond is temporarily protected during the reaction.

29. A process of claim 27, wherein the 16-oxo group is temporarily protected during the reaction.

30. Process for the manufacture of 11:18-dioxygenated 16-oxo-androstane compounds, wherein in a member selected from the group consisting of a Δ$^{4:18}$-3:16-dioxo-11β:18α-oxido-18α-methyl-18-homo-androstadiene and a 3-ketal thereof, the 18:18α-double bond is subjected to oxidative cleavage by hydroxylation of the enol double bond with a member selected from the group consisting of osmium tetroxide, potassium permanganate and an alkali metal perhalate and splitting up the diol formed with a member selected from the group consisting of periodic acid, lead tetraacetate and sodium bismuthate, and the 11β-acetoxy group in the resulting 11β-acetoxy-18-oxo compound is hydrolyzed in an alkaline medium.

31. A process of claim 30, wherein the androstadiene starting material contains a carbon to carbon double bond in the 14:15 position.

32. A process of claim 31, wherein the carbon to carbon double bond is temporarily protected during the reaction.

33. A process of claim 31, wherein the 16-oxo group is temporarily protected during the reaction.

34. Process wherein hydrogen peroxide is caused to react with the Δ$^{5:14:18}$-3-ethylenedioxy-11β:18α-oxido-16-oxo-18α-methyl-18-homo-androstatriene in alkaline solution, the 18:18α-double bond in the resulting 14:15-epoxide is subjected to oxidative cleavage by treatment with hexavalent chromium, the resulting 11β-acetoxy group is hydrolyzed with sodium methoxide, the resulting cyclosemiacetal is treated with a member selected from the group consisting of esterifying and etherifying agents, the product obtained is hydrogenated in the presence of a palladium catalyst and water is split off from the resulting 14-hydroxy compound.

References Cited in the file of this patent

UNITED STATES PATENTS

| | | |
|---|---|---|
| 2,841,531 | Wettstein et al. | July 1, 1958 |
| 2,844,513 | Wettstein et al. | July 22, 1958 |

OTHER REFERENCES

Heusler et al.: Helv. Chim. Acta, vol. 41, No. 4, pages 997–1017 (June 1958).

UNITED STATES PATENT OFFICE
CERTIFICATE OF CORRECTION

Patent No. 2,994,694             August 1, 1961

Albert Wettstein et al.

It is hereby certified that error appears in the above numbered patent requiring correction and that the said Letters Patent should read as corrected below.

Column 1, formula VII should appear as shown below instead of as in the patent:

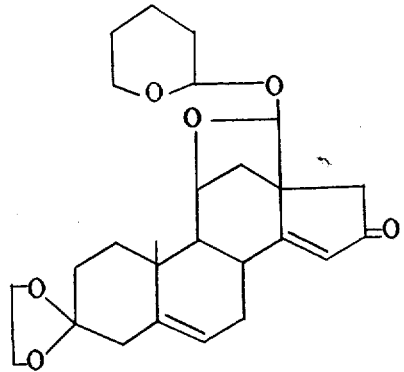

column 7, line 55, after "acetic" insert -- acid --; column 8, line 27, for "its" read -- the --; column 9, line 17, for "-50 C." read -- -5° C. --; line 27, after "3.3" insert -- grams --; line 34, for "ε234 mμ" read -- ε238 mμ --; same column 9, line 69, for "-Δ$^{5:14}$-3-" read -- -Δ$^{5:14}$-3- --; column 10, line 6, for "233 m/μ" read -- 233 mμ --; column 12, line 11, for "(I.V.)" read -- (i.v.) --; line 12, for "5.65/μ" read -- 5.65μ --; line 13, for "5.71/μ (16-CO); 9.14/μ" read -- 5.71μ (16-CO); 9.14μ --; column 13, line 9, for "ε233m/μ" read -- ε233 mμ --; line 38, for "5.76/μ" read -- 5.76μ --; same column 13, line 53, for "2.79/μ" read -- 2.79μ --; column 16, line 62, for "8:13μ" read -- 8.13μ --.

Signed and sealed this 24th day of April 1962.

(SEAL)
Attest:
ESTON G. JOHNSON
Attesting Officer

DAVID L. LADD
Commissioner of Patents